United States Patent [19]

Muller et al.

[11] 4,097,290

[45] Jun. 27, 1978

[54] BALL-POINT INSTRUMENTS WRITING WITH IMPROVED TRANSITORIALLY ERASABLE TRACE AND INK COMPOSITIONS THEREFOR

[75] Inventors: Frank Andrew Muller, West Los Angeles; Henry Peper, Jr., Pacific Palisades, both of Calif.

[73] Assignee: The Gillette Company, Boston, Mass.

[21] Appl. No.: 670,896

[22] Filed: Mar. 26, 1976

Related U.S. Application Data

[63] Continuation of Ser. No. 496,046, Aug. 9, 1974, abandoned.

[51] Int. Cl.$^2$ .................. C08L 93/00; C09D 11/06; C09D 11/08; C09D 11/10
[52] U.S. Cl. ........................... 106/30; 106/29; 106/32; 106/241; 260/27 BB; 260/42.21
[58] Field of Search .............. 401/117, 190, 209; 106/20, 22, 23, 32, 30, 29; 260/27 R, 27 BB, 42.21

[56] References Cited

U.S. PATENT DOCUMENTS

| | | | |
|---|---|---|---|
| 2,036,765 | 4/1936 | Morris | 106/193 |
| 2,852,397 | 9/1958 | Goessling | 106/19 X |
| 2,956,038 | 10/1960 | Juelss et al. | 106/23 UX |
| 3,425,779 | 2/1969 | Fisher et al. | 401/190 |
| 3,572,954 | 3/1971 | Cheron | 401/209 |
| 3,740,159 | 6/1973 | Smagala-Romanoff | 401/117 |
| 3,875,105 | 4/1975 | Daugherty et al. | 106/22 X |

FOREIGN PATENT DOCUMENTS 980,866  1/1965  United Kingdom ............... 106/30

*Primary Examiner*—Joan E. Welcome
*Attorney, Agent, or Firm*—Poms, Smith, Lande & Glenny

[57] ABSTRACT

The invention relates to a ball-point writing instrument capable of writing with an intense colored or black line which is easily visible and readable and as permanent and eventually non-erasable as the best customary ball-pen ink traces, but which, in addition, is easily erasable by mechanical means for an initial period of about two to four hours as a normal graphite pencil trace, without the use of bleaches or chemicals. These properties are attained by the provision of a novel ink composition containing stated rubbers and volatile solvents which control erasability.

3 Claims, No Drawings

BALL-POINT INSTRUMENTS WRITING WITH IMPROVED TRANSITORIALLY ERASABLE TRACE AND INK COMPOSITIONS THEREFOR

This is a continuation of application Ser. No. 496,046, filed Aug. 9, 1974, now abandoned.

Ball-point inks made in recent years utilize high-boiling range vehicles such as mineral oils and various diols and glycols as indicated by U.S. Pat. No. 2,966,418 among others. Oil or solvent soluble dyes are generally employed and the inks produce a trace which is readily absorbed by the porous paper and is non-erasable by mechanical means (although some dyes may be bleached out by the use of chemicals).

In an attempt to produce an erasable, pencil-like trace with a ball-point pen, "liquid lead inks" employing graphite and carbon black in a vehicle similar to a mineral oil, or estergum varnish (U.S. Pat. Nos. 2,715,388 and 2,956,038) or graphite in a carrier of asphaltic or tar-like substances in oil (U.S. Pat. No. 2,852,397) had been employed. These prior art attempts produced very faint pencil-like traces which were difficultly erasable because the oily components carried the fine particles of graphite or carbon black into the porous structure of the paper.

The present invention does not attempt to produce a ball-point writing instrument which writes like a pencil with a faint trace. Instead, this invention provides novel writing compositions which allow a ball-point pen to leave a definite and intense red, green, blue or other colored trace which looks like an ink trace, but is capable of being easily erased shortly after writing (say for a period of two to ten hours after initial writing) and which will become permanent and non-erasable upon further aging.

One of the novel concepts of this invention provides a ball-point instrument which combines the advantages of the intensely colored, easily visible and permanent trace of good ink with the erasability of a pencil trace for a limited time.

Another object of the invention is to disclose the novel ink having properties which provide a writing instrument having the above-stated characteristics.

A further object is to provide a method whereby the erasability of a ball-point ink can be readily controlled.

It is also an object of the invention to provide compositions and disclose specific classes of materials which impart the desired characteristics to the inks of this invention.

These and other objects of the invention will become apparent from the description given hereafter of specific examples, the characteristics of the components and methods of manufacture and testing.

Generally stated the ball-point writing instrument of this invention comprises a barrel containing a tubular cartridge for the ink, the cartridge having a writing tip end including a socket in which a writing ball is rotatably held, the back of the ball being in communication with a body of ink in the cartridge (these physical elements have been known for 30 years or more and need no illustration, but U.S. Pat. Nos. 2,435,123; 2,495,013 and 2,413,904 may be referred to for examples). The use of "pasty" inks in these pens was the custom (see U.S. Pat. No. 2,413,904 ), but these inks were not erasable.

The present invention may be said to relate to a ball-point writing instrument containing an ink capable of depositing an easily visible colored trace by writing with the ball on paper, said trace being transitorily capable of erasure by mechanical means (as by a pencil eraser and without destructive abrasion of the paper), said ink being a thick suspension of finely divided pigmenting particles in a rubber solution.

Applicants discovered that controlled erasability could be obtained by the conjoint and novel use of milled rubber in a vehicle containing a substantial amount of a very low-boiling organic solvent capable of 100% vaporization within less than 60 minutes when tested by a Shell "EvapoRater" under accepted standard conditions. Generally, the rubber employed should be natural or essentially duplicating the chemical structure of natural rubber, such as "Natsyn" which is 90% or more cis-1,4 polyisoprene, and some epichlorhydrin elastomers.

The rubber solution is preferably of high viscosity and includes a proportion of low boiling, rapidly vaporizable solvent in quantity sufficient to very rapidly increase the viscosity of the ink trace deposited and thereby minimize penetration of the paper by the pigment and rubber content of the ink, with the result that the trace is erasable almost immediately after it has been deposited and remains erasable for a period of several hours. The incorporation of a rubber solution into a normal ball-point ink gives rise, at low ink viscosities, to a highly detrimental writing characteristic, namely stringiness, but when the proportion of rapidly vaporizable solvent conforms to the above condition and the ink also contains a high boiling liquid component, stringiness is eliminated.

In addition to the solvents, the vehicle can include substances which act as plasticizers or dispersants for the rubber and finely divided pigmenting material and liquid or solid lubricants, such as oleic acid, lauric acid and stearic acid. The rubber, whether natural pale crepe or synthetic, should have an average molecular weight of between about 100,000 and 900,000 and preferably between 400,000 and 750,000. Milling or mastication under controlled conditions and for a limited time may be required to secure the desired molecular weight. Finely divided pigmenting materials may be milled into the ink composition at the same time but a preferred method is to mix the milled natural unvulcanized rubber into a vaporizable solvent having a boiling point below about 180° C to form a rubber solution of relatively high viscosity heating such solution to between about 55° C and 85° C, adding thereto a thick, pasty dispersion containing 30% to 45% of finely divided pigmenting material in a liquid vehicle having a boiling range above about 300° C and stirring the mixture to stable homogeneity. By referring to the pigmenting material as being in a finely divided condition, reference is made to particle sizes within the range of about 0.01 microns to about 5 microns, the lower figure being a limitation as to visibility and the upper figure being limited by ball-point clearance; that is, the gap between the ball and the retaining lip of the socket.

As at present advised, the various materials mentioned and the compositions of the ink on a percentage by weight basis may be said to fall within the following range.

| COMPONENTS | % | PREFERRED % |
|---|---|---|
| Rubber Molecular weight 750,000 | 15–45 | 27 |
| Low-boiling solvent (B.P. below ab.180° C) | 15–50 | 29 |
| High-boiling solvent (B.P. above ab. 300° C) | 15–35 | 22 |

-continued

| COMPONENTS | % | PREFERRED % |
|---|---|---|
| Pigment (Dry basis) | 12-30 | 18 |
| Solid lubricant | 2-8 | 4 |

Some solvents perform in dual roles: DOP (di octyl phthalate) is a solvent, facilitates dispersion of rubber and pigments, is a plasticizer, and tends to lubricate the ball during writing. Inks having good writing properties in ball-point pens have been made by the use of DOP, but the trace did not erase properly and had a tendency to transfer. The term transfer as used herein refers to the ability of a trace to be transferred to a superimposed paper under light pressure shortly after having been written on the underlying paper. Although DOP can be termed a high-boiling solvent, it is not a solvent which is effective in insuring an erasable trace. As previously indicated, erasability depends upon the use of a volatile low-boiling solvent which has a B.P. range below about 180° C and exhibits 100% evaporation within a 60-minute time period as measured with the Shell Evapo-Rater. It is desirable, however, to have a mixture of liquids, low-boiling solvents and high-boiling solvents having dual functions as previously indicated in the table of components. Very effective low-boiling solvents included a lacquer diluent of aliphatic petroleum naphtha which exhibited 100% evaporation in 2.3 minutes having a distillation range of 94°-104° C. Another good low-boiling solvent which insured erasability was a petroleum naphtha fraction having a distillation range of 120°-139° C this naphtha having a 100% evaporation in 8.3 minutes. Since DOP has a boiling point of about 389° C it is not a volatile solvent. There are many aromatic solvents such as toluol, xylol, ethylbenzene, etc. which can be used, although the aliphatic petroleum solvents (without completely excluding other types) are preferred for use in these mixtures. Lack of toxicity should be a factor to be considered.

Although easy erasability of trace is a very important desired property of the writing instrument of this invention, it is also important that the instrument apply that trace during writing in a smooth, uniform and dependable manner. Excellent erasability can be obtained by the use of rapidly vaporizing solvents, but their sole use in the ink composition produces unsatisfactory writing quality. Writing quality and smoothness is improved by substituting a more viscous, slower evaporating solvent for a portion of the volatile solvent, and the resulting combination extends the period of time from initial writing during which the trace can be readily erased.

The erasable inks of this invention tend to be viscous and exceed the viscosity of customary glycol-based ball-point inks. It may be deemed necessary or desirable to provide the writing instrument, or the cartridge with its body of ink, with means for subjecting the body of ink to a superatmospheric pressure in order to facilitate the flow and supply of ink to the ball. The precise pressure required will depend upon the gap between the ball and the lip of the ball-retaining socket, and upon the ink viscosity which is governed in turn by the average molecular weight of the rubber and by the quantity and particle size range of the finely divided pigmenting material being employed. The required pressure may be applied to good advantage only during actual writing by the use of the writing pressure actuated pressurizing device of the character shown in Malm U.S. Pat. No. 3,420,610, or by the use of a suitable gas injected into or generated within the cartridge above the body of ink as indicated in numerous patents including U.S. Pat. No. 3,130,711; Belgian Pat. No. 517,217; French Pat. Nos. 1,053,515; 1,055,674, or pressurized by manual means as in U.S. Pat. No. 3,282,255. The use of many gases has been contemplated, including air, nitrogen, carbon dioxide, dichloro tetrafluoroethylene, octa fluoro and deca fluoro cyclobutane, etc. Inert or non-reactive gases are preferred.

The phrase "means for subjecting the ink within the cartridge to a superatmospheric pressure" refers to any of the above means and methods and to their equivalents, it being understood that the pressure may vary with the characteristics of the ink, the gap in the ball-point, the ambient temperature and the relative volume of ink and the gas in the cartridge.

The following tabulation presents typical formulations or erasable inks for use in writing instruments having a ball point.

| | BLACK 839-41A | BLACK 814-96A | RED 814-92C | GREEN 839-41 | BLUE 839-26C |
|---|---|---|---|---|---|
| Natural Rubber | 22.5% | 26.0% | 29.0 | 22.5% | 22.5% |
| Aliphatic Diluent #6 | 23.5 | | | 23.5 | 23.5 |
| Aliphatic Solvent 360-66 | | 17.0 | | | |
| V M & P Naphtha | | 14.0 | 29.0 | | |
| Terphenyl (HB 40) | 30.0 | 26.0 | | | |
| DOP | | | | 33.5 | 27.0 |
| Mineral Oil | | | 27.0 | | |
| Pigment | 20.0 | 17.0 | 15.0 | 16.5 | 23.0 |
| Stearic & Lauric Acid | 4.0 | | | 4.0 | 4.0 |
| Erasability | Good | Good | Better | Better | Better |

Explanatory:
Natural Pale Crepe Rubber Milled and Masticated to Average
Mol. Weight of About 400,000 – 750,000

| Aliphatic Diluent #6 | Dist. Range | 94° – 104° C = 100% Evap. | 2.3 Min. |
| Solvent 360-66 | Dist. Range | 154° – 173° C = 100% Evap. | 42.1 |
| V M & P Naphtha | Dist. Range | 121° – 139° C = 100% Evap. | 8.3 |
| Terphenyl (HB 40) | Boiling | 345° – 396° C = 100% Evap. | |
| DOP | Boiling Pt. | 386.9° C | |
| Black | Pigment | 839-41A, Carbon Black 0.08 Micron | |
| Black | " | 814-96A, Graphite (2-5 Micron) | |
| Green | " | 839-41 Phthalocyanine Green | |

-continued

| Blue | " | 829-26C | 0.015 Micron Phthalocyanine Blue 0.015 Micron Victoria Blue 10.5% |
| --- | --- | --- | --- |
| Red | " | 814-92C | 0.025 Micron Organic Red 0.015 Micron Suspended in Mineral Oil (35% Pigment Dry Basis) |

Erasability can be evaluated by manual erasure and visual observation, but this involves personal factors such as pressure applied, size of surface being erased, etc. A more accurate evaluation can be conducted by applying the trace by a standard writing test method in which the paper is advanced beneath the writing instrument at a rate of 11.5 mm. per 10 cycles and at the same rate under an erasing head provided with an Eberhard-Faber Pink Pearl Pencil Eraser #101 (Shore A34 Durometer hardness, ASTM D 2240), applied to the paper bearing the trace under a load of 390 grams upon a surface measuring 9 mm. by 23.8 mm. in the direction of travel, the erasing head reciprocating at a rate of 80 cycles per minute, the length of each stroke being 63.5 mm. Each trace is thus subjected to 7 cycles of erasing and results can be visually observed or rated by photometer readings.

A ball-point writing instrument containing an ink having the characteristics hereinabove referred to should provide all of the advantages of a normal ball-point writing instrument and intense ink with the erasability of a pencil, without the lack of permanence of pencil notation.

The important and major components have been stressed, but the presence in the ink of additives such as corrosion inhibitors, resins to increase permanence, stabilizing agents, preservatives, parting compounds (between ink in a reservoir and a gaseous pressurizing agent), dispersing agents, lubricants, etc. is not precluded.

We claim:

1. In a ball-point writing instrument containing an ink capable of depositing an intensely colored trace by writing with its ball on paper, said trace being capable of erasure by the use of a pencil eraser, said ink consisting essentially of between 15% and 45%, by weight, of natural rubber or rubber which essentially duplicates the chemical structure of natural rubber, said rubber being dissolved in a mixture of (a) a volatile low boiling organic solvent having a boiling point less than 180° C and exhibiting 100% evaporation within 60 minutes, said volatile low boiling solvent rapidly increasing the viscosity of the ink in the trace to minimize the penetration of the paper by the ink, and (b) a high boiling organic liquid solvent having a boiling point of greater than 300° C, said vaporizable organic solvent being present in an amount of between 10% and 50%, by weight, and said high boiling organic liquid solvent being present in an amount of between 15% and 30%, by weight, and from 12% to 30%, by weight, of pigment particles uniformly dispersed in the rubber solution.

2. A ball-point writing instrument as stated in claim 1 wherein the pigment particles have a particle size of between 0.01 microns to about 5 microns.

3. A ball-point writing instrument as stated in claim 1, wherein said rubber has an average molecular weight of between about 100,000 and 900,000.

* * * * *